US010445585B1

(12) United States Patent
Ludden et al.

(10) Patent No.: US 10,445,585 B1
(45) Date of Patent: Oct. 15, 2019

(54) EPISODIC IMAGE SELECTION

(71) Applicant: Amazon Technologies, Inc., Seattle, WA (US)

(72) Inventors: James Matthew Ludden, Bellevue, WA (US); Mitchell Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 402 days.

(21) Appl. No.: 15/239,073

(22) Filed: Aug. 17, 2016

(51) Int. Cl.
H04N 21/482 (2011.01)
G06K 9/00 (2006.01)
G06K 9/62 (2006.01)
H04N 21/472 (2011.01)
H04N 21/44 (2011.01)

(52) U.S. Cl.
CPC ..... *G06K 9/00751* (2013.01); *G06K 9/00228* (2013.01); *G06K 9/623* (2013.01); *H04N 21/44008* (2013.01); *H04N 21/47202* (2013.01); *H04N 21/4821* (2013.01); *G06K 2209/01* (2013.01)

(58) Field of Classification Search
None
See application file for complete search history.

(56) References Cited

U.S. PATENT DOCUMENTS

| 2010/0332560 | A1* | 12/2010 | Gerbasi, III | G11B 27/034 707/812 |
| 2014/0037264 | A1* | 2/2014 | Jackson | H04N 5/44513 386/230 |
| 2016/0188997 | A1* | 6/2016 | Desnoyer | G06T 7/55 382/190 |
| 2016/0227269 | A1* | 8/2016 | Han | H04N 21/482 |
| 2016/0358628 | A1* | 12/2016 | Liu | G11B 27/031 |

* cited by examiner

*Primary Examiner* — Omar S Parra
(74) *Attorney, Agent, or Firm* — Thomas | Horstemeyer, LLP

(57) ABSTRACT

The targeted selection of certain representative images from content is described. In one example case, images in video content are first attributed a quality score based on an image quality factor, such as the brightness and contrast of the images. A subset of the images are identified as episodic image candidates using an image quality threshold. Image scores of one or more of the episodic image candidates are scaled based on one or more episodic image selection factors. Episodic images for the video content are selected from among the episodic image candidates using one or more episodic image selection rules. In some cases, a number of the episodic images are filtered out, for example, as being too similar to each other or for failing to be distinguishable from episodic images of other content. The episodic images are provided for use as representative images for the video content.

20 Claims, 7 Drawing Sheets

EPISODIC IMAGE SELECTION

BACKGROUND

A content delivery or distribution network is a geographically distributed network of computer servers deployed in data centers at various locations. Content delivery networks are designed to serve content, such as webpages, data files, media content, and other content to users with good availability and performance.

Content delivery networks have made new types of services available to those with computing devices and network connections. For example, video on demand services allow users to select and watch video content at any time and at any location with network connectivity. Video on demand services can serve video content to various types of computing devices, allowing viewing and/or downloading of such content on many different types of devices. Today, many service providers offer access to video, audio, and other types of media content based on pay-per-view, subscriber-based, and other purchase models.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, video on demand services allow users to select and watch video content at any time and at any location with network connectivity. Video on demand services can serve video content to various types of computing devices, allowing viewing and/or downloading of such content on many different types of devices. Video on demand services typically offer various user interfaces to present the available video content to users. Representative images from video content can be used as visual indicators or cues to the associated video content, and such representative images can be easily recognized by users to identify and distinguish between different video content.

Because of the significant amount of video content available through video on demand services, it can be relatively difficult and time consuming to manually identify one or more representative images for each item of video content available through video on demand services. For example, just one television series can include multiple episodes in each of multiple seasons, each of which should be distinguishable to users browsing the episodes in the series.

In the context outlined above, embodiments directed to the selection of representative, episodic images of video content are described herein. In one example, a number of images in video content are first attributed image quality scores based on one or more image quality factors, such as the brightness and/or contrast of the images. A subset of the images in the video content are identified as episodic image candidates through the application of an image quality threshold to the image quality scores of the images. Using the image quality threshold, the number of episodic image candidates for the video content can be a relatively small subset of the total number images in the video content.

The image scores of the episodic image candidates can be further scaled or adjusted based on episodic image selection factors. Among others, the factors can include whether there is text in an image, whether there is a face in an image, and a time code associated with an image. Once the scores of the episodic image candidates have been scaled depending on one or more of those factors, episodic images for the video content can be selected from among the episodic image candidates using additional selection rules or thresholds. In some cases, a number of the episodic images are later rejected or filtered out based on certain considerations. For example, one or more episodic images can be filtered out if they are too similar to each other or if they are not sufficiently distinguishable from the episodic images of other content. After being scored, scaled, selected, filtered, etc., the episodic images can be provided as representative images for display in user interfaces of video on demand services, for example, at various client devices.

Figure 1:
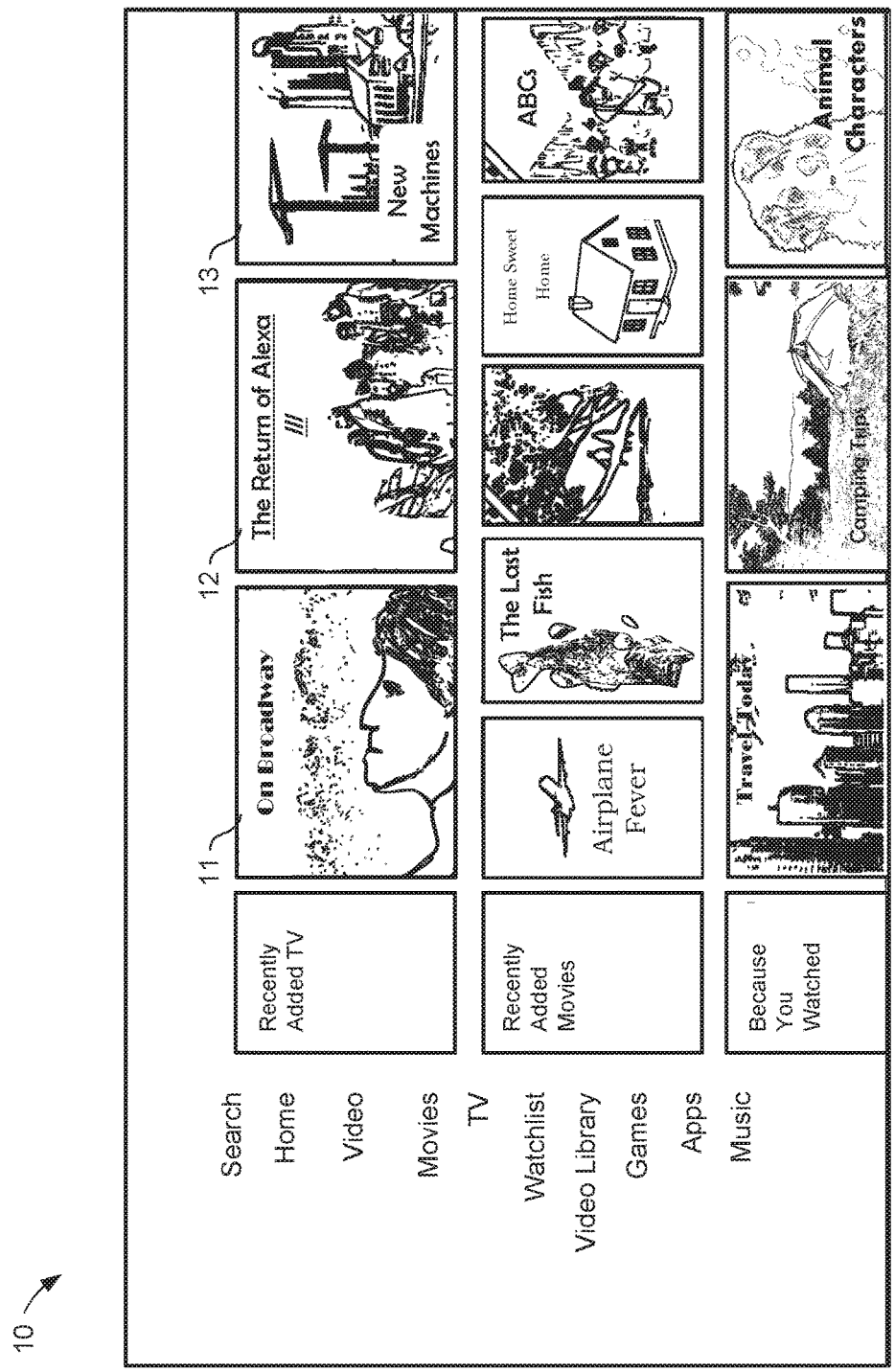
FIG. 1 illustrates a user interface with episodic images for browsing video content according to example embodiments described herein.

To further explain the objects of the embodiments, FIG. 1 illustrates a user interface 10 for browsing video content according to example embodiments described herein. The user interface 10 is provided as one example of an interface incorporating episodic images that can be used to present a range of video content available through video on demand or content distribution services. Other user interfaces can present other episodic images in any arrangement or suitable fashion.

As shown in FIG. 1, the episodic images 11-13 are representative of individual items of video content, including content titled "On Broadway," "The Return of Alexa III," and "New Machines." Each of the episodic images 11-13 is selected from and visually representative of an individual item of underlying video content but could be representative of a category or series of content in some cases. As noted above, because of the significant amount of video content available through video on demand services, it can be helpful to users to have each of the episodic images 11-13 as a reference to the underlying content with which it is associated. However, it can be relatively difficult and time consuming to manually identify one or more episodic images for each item of video content available through video on demand services.

Figure 2:
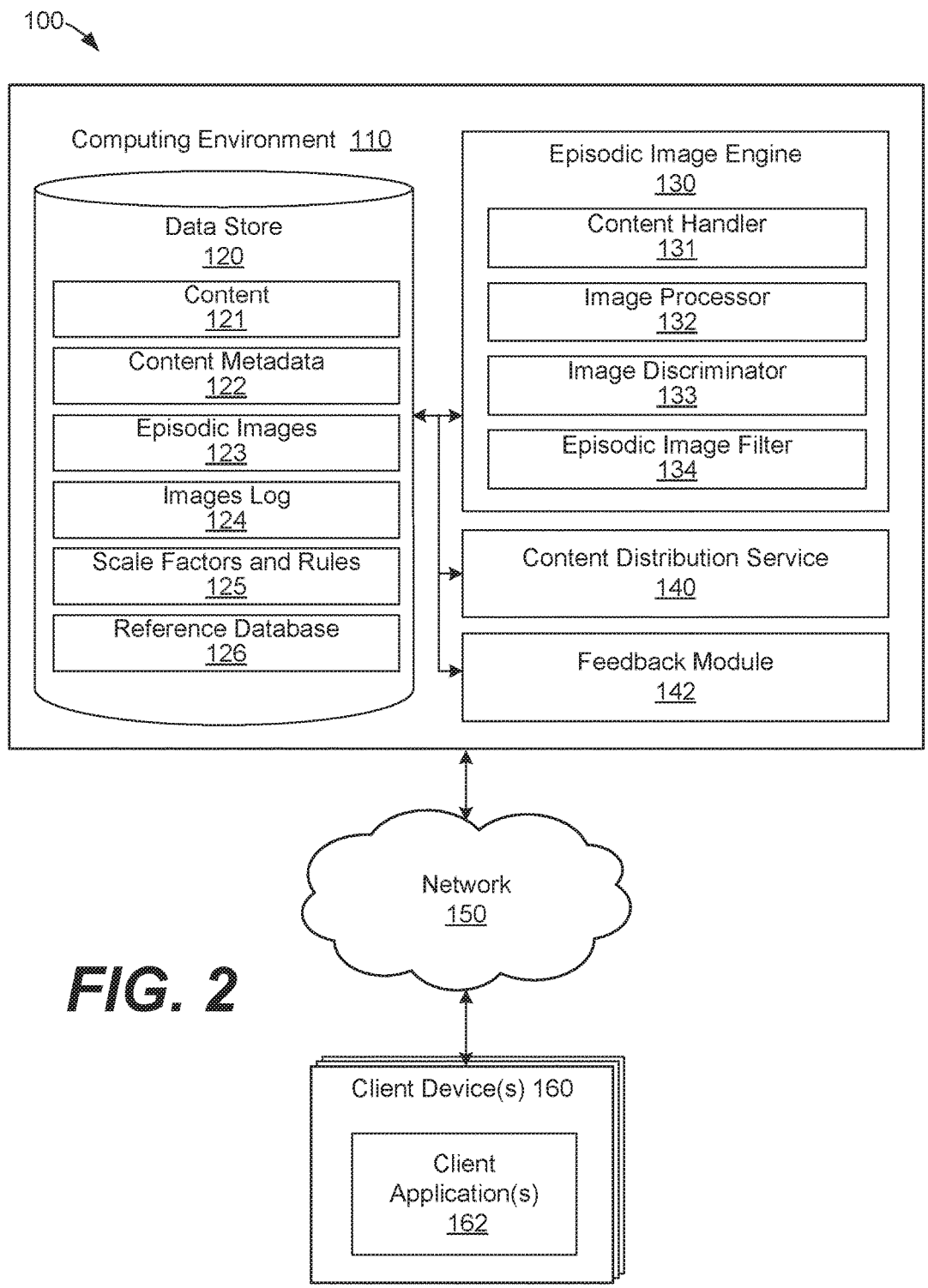
FIG. 2 illustrates a networked environment for episodic image selection according to example embodiments described herein.

For the selection of episodic images, FIG. 2 illustrates a networked environment 100 according to example embodiments described herein. The networked environment 100 includes a computing environment 110, a network 150, and a client device 160. The computing environment 110 includes a data store 120, an episodic image engine 130, a content distribution service 140, and a feedback module 142, each of which is described in further detail below.

The computing environment 110 can be embodied as one or more computing devices or systems. In various embodiments, the computing environment 110 can include one or more desktop computers, laptop computers, or computing devices arranged in one or more server or computer banks. The computing devices can be located at a single installation site or distributed among different geographical locations. As further described below in connection with FIG. 7, the computing environment 110 can include a plurality of computing devices that together embody a hosted computing resource, a grid computing resource, and/or other distributed computing arrangement. In some cases, the computing environment 110 can be embodied as an elastic computing resource where an allotted capacity of processing, network, storage, or other computing-related resources vary over time.

The computing environment 110 can also be embodied in part as various functional or logical elements (e.g., executed computer-readable instructions, logic circuitry, processing circuitry, etc.) executed or operated to direct it to perform aspects of the embodiments described herein. In that context, the episodic image engine 130, content distribution service 140, and feedback module 142 can be embodied as functional or logical elements of the computing environment 110.

The network 150 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with the client device 160 and the merchant platform 210 using various systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. Although not illustrated, the network 150 can include connections to any number of network hosts, such as website servers, file servers, networked computing resources, databases, data stores, or any other network or computing architectures.

The client device 160 is representative of one or more client devices. The client device 160 can be embodied as any computing device, processing circuit, or processor based device or system, including those embodied in the form of a desktop computer, a laptop computer, a personal digital assistant, a wearable computing device, a cellular telephone, or a tablet computer, among other example computing devices and systems. The client device 160 can include one or more subsystems and/or peripheral devices. For example, the peripheral devices may include one or more input devices, such as a keyboard, keypad, touch pad, touch screen, microphone, scanner, mouse, joystick, camera, one or more buttons, etc. The peripheral devices may also include a display, indicator lights, speakers, global navigation satellite system (GNSS) circuitry, accelerometer, or other components, depending upon the primary use of the client device 160.

As illustrated in FIG. 2, the client device 160 can execute various applications, such as the client application 162. In one embodiment, the client application 162 can be embodied as a browser application that receives and renders network pages generated by the computing environment 110 via the network 150. In that sense, the client application 162 can be embodied as a hypertext-based internet browser or any other type of browser, without limitation. Alternatively, the client application 162 can include a standalone or dedicated application that interacts with the computing environment 110 using a suitable protocol via the network 150. In one aspect of the embodiments, the client application 162 can be used to access, control, and/or modify the operations of the computing environment 110 in the selection of episodic images. In other embodiments, a user can directly access, control, and/or modify the operations of the computing environment 110 without accessing it using the client device 160 via the network 150. In other aspects, the client application 162 can be used to access the content 121 through the content distribution service 140 using one or more user interfaces such as the example user interface 10 shown in FIG. 1.

Turning back to the computing environment 110, the data store 120 includes memory areas for the storage of content 121, content metadata 122, episodic images 123, an images log 124, factors and rules 125, and a reference database 126. The content 121 includes various items of video (and potentially other) content, such as television shows, movies, movie trailers, documentaries, short videos, etc. In that context, it should be recognized that each item stored in the content 121 can include a sequence of images arranged or organized for presentation over a period of time. The content 121 can be received or obtained from any source and can be captured in any suitable video and audio formats (e.g., frame rate, horizontal and vertical resolution, aspect ratio, mono, stereo, surround sound, etc.) and/or standards (e.g., Advanced Television Systems Committee (ATSC), Digital Video Broadcasting (DVB), etc.). The content 121 can be in raw format or encoded in any suitable known lossy or lossless formats.

The content 121 is not limited to video content, however, as the concepts described herein can be applied to other types of content including photo strips, audio, text (e.g., web pages, news articles, books, etc.), and other forms of content. As described in further detail below, the episodic image engine 130 can process the items of video (or other) content stored in the content 121 to select a number of representative episodic images associated with the video content.

The content metadata 122 includes metadata associated with the items of video content stored in the content 121. For each item of video content, the content metadata 122 can include a data file that includes a synopsis, genre, list of actors, segment timecodes, scene transition timecodes, timecodes for the insertion of advertisements, encoding information, format information, and other information related to the item of video content. The episodic image engine 130 can reference the content metadata 122 to help select episodic images associated with video content stored in the content 121 as described herein.

The episodic images 123 include a number of episodic images selected by the episodic image engine 130 during the selection processes described herein. The episodic images 123 can include a number (e.g., 1, 5, 10, 20, or more) of episodic images for individual ones of the video content items stored in the content 121.

The images log 124 can include a log of the processing tasks performed by the episodic image engine 130 during episodic image selection processes. For example, the images log 124 can include a log of the scores calculated and the rules and factors applied to identify individual ones of the episodic images for reference at any time. Further, the images log 124 can include a listing of timecodes of images that were identified as potential episodic images or episodic image candidates but not ultimately selected as episodic images for reference at any time.

The factors and rules 125 include various episodic image factors and rules by which the episodic image engine 130 can select episodic images. Examples of factors and/or rules include image quality thresholds, whether there is text in an image, whether there is a face in an image, and a time code associated with an image. Other examples of factors and rules are described in further detail below.

The reference database 126 includes various types and forms of reference information that can be used by the episodic image engine 130 to select episodic images. Among other information, the reference database 126 can include information similar to that found on the Internet Movie Database (IMDb®), such as information related to movies and television shows, including actors, actresses, producers, production crew, fictional and/or cartoon characters, biographies, summaries, and reviews. The reference database 126 can also include portrait photos of actors and actresses for reference by the episodic image engine 130 during facial recognition processes as described below. In extension to information for identifying actors and actresses, the reference database 126 can include information for identifying various cartoon characters, such as the shape features, facial features, and/or color palettes of cartoon characters. Additionally, the reference database 126 can include a log of common logos, items incorporating trade dress features, trademarks, tradenames, etc., for reference by the episodic image engine 130.

Turning to the episodic image engine 130, it includes a content handler 131, an image processor 132, an image discriminator 133, and an episodic image filter 134. Among other functions, the content handler 131 is configured to retrieve one or more items of content stored in the content 121, such as video content, and provide images from that video content to the image processor 132, the image discriminator 133, and the episodic image filter 134 for processing.

The image processor 132 is configured to perform image processing tasks on individual images (or groups of images) in video content stored in the content 121. For example, the image processor 132 can determine the brightness, contrast, sharpness, and other image-related characteristics of individual images in video content. Those characteristics can be used to provide initial image quality scores to individual images in video content. As another example, the image processor 132 can detect faces, characters, logos, landmarks, text, or other features in images, and that information can be used to scale or weight the scores of the images. Other example functions and processes performed by the image processor 132 are described in further detail below with reference to FIGS. 3, 4, 5A, 5B, and 6.

The image discriminator 133 is configured to evaluate one or more images in the video content stored in the content 121. Based on those evaluations, the image discriminator 133 can identify a set of episodic image candidates. For example, after initial image quality scores for certain images are determined by the image processor 132 (e.g., based on brightness, contrast, and/or other image-related characteristics), the image discriminator 133 can cull or pick out a limited set of those images as episodic image candidates based on the scores.

In another case, after image quality scores of images are determined by the image processor 132, those scores can be scaled or weighted based on whether the image processor 132 detects faces, logos, or other features in the images. The image discriminator 133 can then cull or pick out a limited set of those images as episodic image candidates based on the scaled or weighted scores. Over one or more iterative processes, the image discriminator 133 can select one or more episodic images out from among the plurality of episodic image candidates for any given item of video content using one or more episodic image selection factors or rules defined in the factors and rules 125. Other example functions and processes performed by the image discriminator 133 are described in further detail below with reference to FIGS. 3, 4, 5A, 5B, and 6.

The episodic image filter 134 is configured to further evaluate the episodic images identified by the image discriminator 133. More particularly, the episodic image filter 134 can evaluate a number of episodic images and select a more limited number of them based on certain factors or rules. For example, the episodic image filter 134 can compare an episodic image for one item of video content to an episodic image for another item of video content to determine a distinguishability metric (e.g., correlation or pixel-level amount of difference) between them. In that way, for example, the episodic image filter 134 can determine whether the episodic image selected for one item of video content is sufficiently different from that selected for other items of video content. This additional process of evaluating or filtering episodic images can be useful when selecting episodic images for certain types or genres of video content, such as gameshows, where it may be likely that episodic images selected for two different shows are too similar to each other for a user to distinguish between them.

Before continuing, it is noted that the episodic image engine 130 can select or identify any suitable number of episodic images for the items of video content stored in the content 121. Those episodic images can be stored and cataloged as the episodic images 123 for future reference by the content distribution service 140, for example, in the generation and presentation of user interfaces for content distribution.

The content distribution service 140 is configured to provide a service, such as a video on demand service, for the distribution of various types of content including video content stored in the content 121. Thus, the content distribution service 140 can serve up the content 121 as it is requested by users. To facilitate the selection of the content 121 by users, the content distribution service 140 can also provide or serve one or more of the episodic images 123 for display in one or more user interfaces such as the user interface 10 shown in FIG. 1. It should be appreciated that the content distribution service 140 (and other components shown in FIG. 2) are provided as representative examples for discussion. In practice, the functions performed by the content distribution service 140 may be distributed among computing devices at various geographic locations.

The feedback module 142 is configured to track statistics or other use-related data associated with the episodic images 123 and the content 121. As one example, after a set of episodic images are selected for an item of video content, the content distribution service 140 can serve up different ones of those episodic images for display in different user interfaces on different client devices 160. Based on any difference in the selection (or rate of selection) of the same item of video content by users at the different client devices 160, the feedback module 142 can weight certain episodic images as potentially leading to a greater likelihood of the selection of the underlying content. For an episodic image associated with a greater likelihood that the underlying content will be selected, the feedback module 142 can identify the factors which resulted in the selection of that episodic image with reference to the images log 124. The feedback module 142 can then apply similar factors in the future for the selection of new episodic images for similar content in an effort to improve the selection of episodic images.

In the context of the images log 124, the episodic image engine 130 can log various aspects of the operations of the image processor 132, the image discriminator 133, and the episodic image filter 134 and store that information for later reference. For example, the episodic image engine 130 can log any image-related characteristics, detected faces, text, logos, etc., or other information determined by the image processor 132 for individual images in video content and store that log in the images log 124. Similarly, the episodic image engine 130 can log which images are selected by the image discriminator 133 as episodic image candidates, regardless of whether the candidates are finally selected as episodic images. Generally, the episodic image engine 130 can log information related to the image processing and episodic image selection tasks performed by the episodic image engine 130 for reference at a later time. That log information can be stored in the images log 124.

Figure 3:
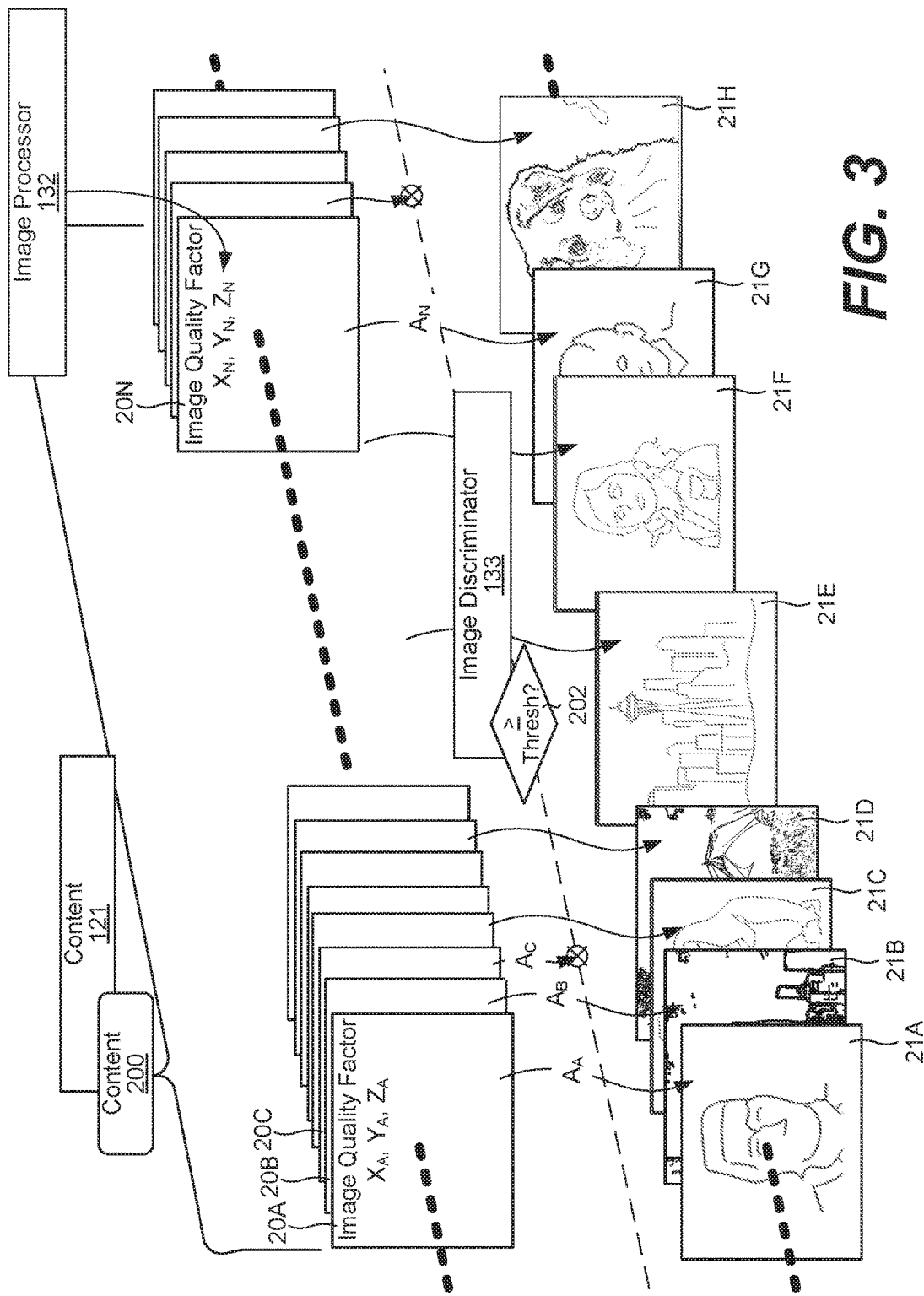
FIG. 3 illustrates the assignment of image quality scores and the identification of a subset of images from video content according to example embodiments described herein.

Turning to more particular examples, FIG. 3 illustrates the assignment of image quality scores and the identification of a subset of images from an item of video content 200 according to example embodiments described herein. The operations described with reference to FIG. 3 represent a first round of processing tasks that can be performed by the image processor 132 and the image discriminator 133 in the selection of episodic images.

Before turning to a more detailed description, the item of video content 200 and the images 20A-20N shown in FIG. 3 are representative of content and images in video content but are not limiting. In practice, the image processor 132 and the image discriminator 133 can process a significant number of individual images (up to and including all images) in any given item of video content. It is not necessary in every case, however, that a large number (or all) images are processed. In some cases, images from one or more defined periods of time (e.g., 1:30-2:45 and 10:23-11:34 minutes, etc.), content ranges (e.g., first quartile, last quartile, 15%-20% and 90-100%, etc.), or other portions of an item of video content can be processed. In other words, image processing for episodic image selection can start, end, and begin and end again at any predetermined points or times in video content. Thus, the number of images or ranges of images processed can depend on various factors, such as the available processing time, the associated processing costs, the range or ranges in which episodic images have been historically selected, and other factors.

In FIG. 3, the item of video content 200 is shown including images 20A-20N, among others. The images 20A-20N are processed by the image processor 132 and evaluated by the image discriminator 133 as described below. The image processor 132 is configured to determine or calculate one or more image quality factors or metrics (e.g., $X_A$, $Y_A$, $Z_A$ $X_N$, $Y_N$, $Z_N$) for the images 20A-20N. The image processor 132 can determine one or more of the contrast, brightness, sharpness, distortion, noise, dynamic range, color accuracy, exposure, or other image quality factors or metrics of each of the images 20A-20N or any subset of the images 20A-20N. The image processor 132 can determine or calculate the factors using any suitable image processing techniques to arrive at values for the image quality factors or metrics. Using the quantifiable image quality factor or metric values, individual ones of the images 20A-20N can be compared to each other on an objective basis.

The number and type of image quality factors determined by the image processor 132 can vary based on certain factors from item to item of video content stored in the content 121. For example, the number and type of image quality factors can be based on the genre of the video content, the length of the video content, the source of the video content, or other relevant factors. Further, in some cases, the number and type of the image quality factors can vary from image to image even for the same item of video content, based on defined periods of time, content ranges, or other attributes associated with the video content.

A single score can be determined for each of the images 20A-20N based on a combination of the image quality factors determined by the image processor 132. For example, the image processor 132 can calculate a weighted average of the contrast $X_A$, the brightness $Y_A$, and the sharpness $Z_A$ of the image 20A to determine a base score $A_A$ for the image 20A. The image processor 132 can also calculate a weighted average of the image quality factors of the other images 20B-20N (e.g., $A_B$ for the image 20B, $A_C$ for the image 20C, $A_N$ for the image 20N, etc.) in a similar way. The weights used for determining a weighted average can vary based on certain factors, such as the genre of the video content, the length of the video content, the source of the video content, or other relevant factors, but it is not necessary that different weights are used in every case.

As also shown in FIG. 3, the image discriminator 133 can identify a subset of the images 20A-20N as episodic image candidates using an image quality threshold 202. The image quality threshold 202 can be defined in the factors and rules 125 and, in some cases, be particularly-selected for the video content 200 as compared to other video content. The image discriminator 133 can compare each of the scores (e.g., $A_A$, $A_B$, $A_C$, etc.) against the image quality threshold 202 to cull out images that fail to meet the image quality threshold 202. In FIG. 3, for example, the score $A_C$ of the image 20C is presented as an example of one that did not meet the image quality threshold 202. Through the application of the image quality threshold 202, the image discriminator 133 identifies the subset of images 21A-21H as episodic image candidates among the images 20A-20N. In practice, any suitable number of episodic image candidates can be identified by the image discriminator 133, for example, by adjusting the level of the image quality threshold 202. As examples, the image quality threshold 202 can be selected to arrive at a certain percentage (e.g., 5%, 10%, or another percentage) or a certain number (e.g., 5, 10, 20, 30, etc.) of the total number of processed images being identified as episodic image candidates.

Figure 4:
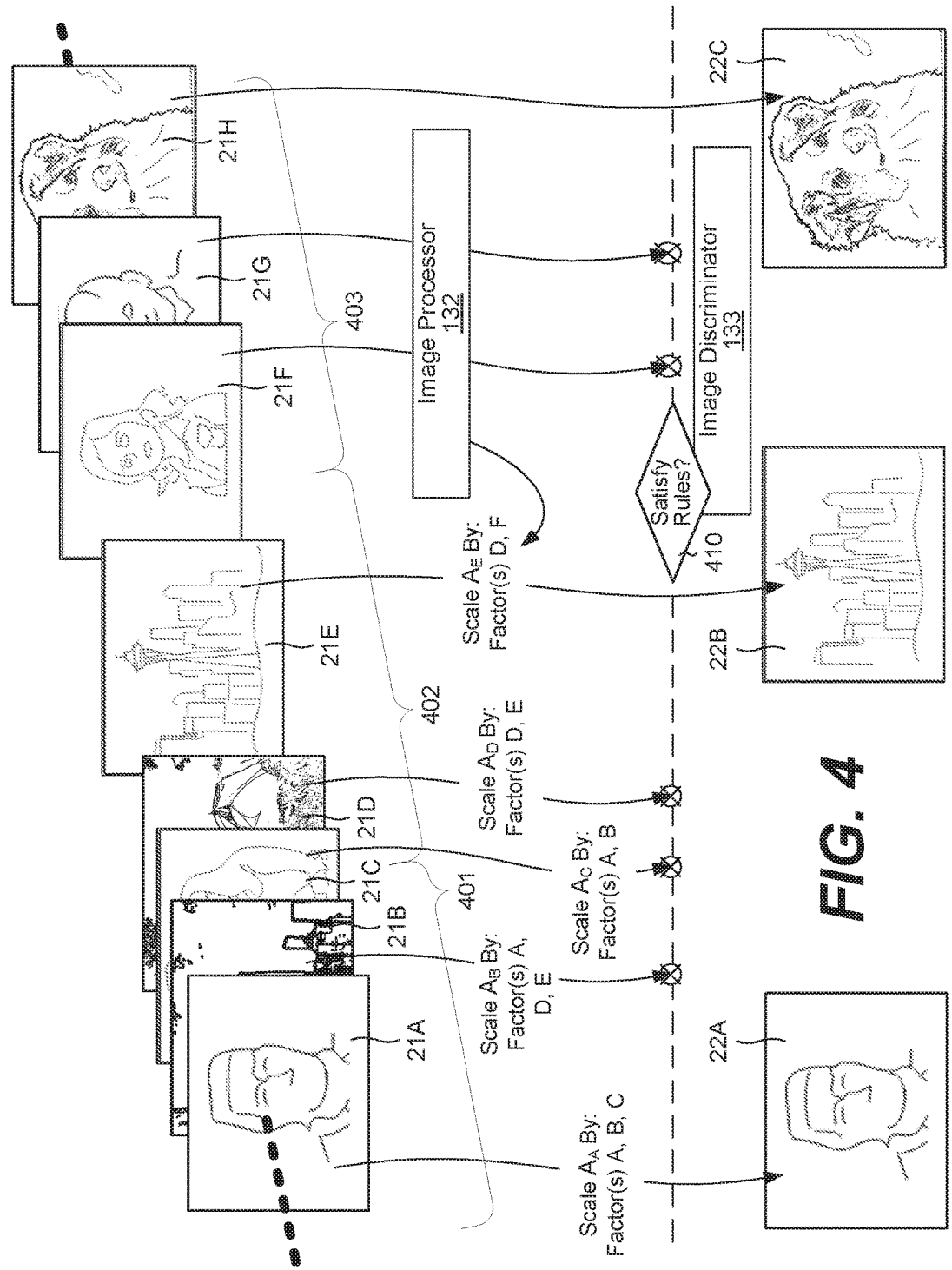
FIG. 4 illustrates scaling image scores and selecting episodic images from video content according to example embodiments described herein.

Turning to additional aspects of the embodiments, FIG. 4 illustrates an example of scaling image scores and selecting episodic images. In FIG. 4, the scores (e.g., $A_A$, $A_B$, $A_C$, etc.) of the episodic image candidates 21A-21H are further scaled or weighted based on one or more additional factors (e.g., episodic selection factors) relevant in the selection of episodic images. The image processor 132 is configured to examine or evaluate the episodic image candidates 21A-21H to determine whether or not one or more additional factors apply to the episodic image candidates 21A-21H, respectively.

The additional factors can include whether or not there is text in an image, whether or not there is a face (or certain number of faces) in an image, or whether or not an image is associated with a timecode or time range. As other examples, the factors can include whether or not a specific actor, actress, or other character (e.g., through facial recognition) is present in an image, the popularity of the actors, actresses, or characters (e.g., with reference to the reference database 126) in an image, and whether or not there is a logo, trademark, tradename, or item incorporating certain trade dress features in an image (e.g., with reference to the reference database 126).

As shown in FIG. 4, because the additional factors can depend upon the content in the respective episodic image candidates 21A-21H, certain scaling factors might apply to one episodic image candidate but not another. For example, the factors A, B, and C are applied to scale the score $A_A$ of the episodic image candidate 21A, while the factors A, D, and E are applied to scale the score $A_B$ of the episodic image candidate 21B. Certain examples of the determination of which scaling factors should be applied to which episodic image candidates are described in further detail below with reference to FIGS. 5A and 5B.

Each of the additional scaling factors can carry its own scaling weight, and the scaling weights can depend upon certain characteristics of the video content. For example, factors related to the presence of certain actors or actresses can carry more weight in items of video content classified under the genre of drama and less weight under the genre of comedy. As another example, a factor related to image timecodes or time ranges might carry separate weights for the time ranges 401, 402, and 403 shown in FIG. 4, although those weights can vary among items of content. For gameshows, the selection of episodic images from the relatively early time range 401 might be preferred over the relatively late time range 403 to avoid spoilers. For late-night shows, the time range 402 might be preferred for the likelihood of capturing images of guests. For action videos, on the other hand, there may be no preference among the time ranges 401, 402, and 403, or the relatively late time range 403 might be preferred. Thus, the scaling weights associated with each of the factors (e.g., A-F in FIG. 4) can vary from one item of video content to another.

In other cases, the persistence (or lack of persistence) of faces, text, or other features in a number of images over time can lead to the use of different scaling factors. For example, the detection of text or other objectionable items, such as guns, drugs, drug paraphernalia, and other items, by the image processor 132 in one episodic image candidate can weigh against the selection of that image as an episodic image. However, if all images in video content include text (or the same text in the same relative location), that condition may result in the same (or no) weight being applied to all the images. Similarly, if the image processor 132 detects a face in a single frame, that single detection without the detection of the same face in one or more time-adjacent frames can be an indication of an error in facial recognition and, thus, no application of a scaling factor.

After the image processor 132 determines which factors are respectively relevant to the episodic image candidates 21A-21H, the image processor 132 is configured to scale the scores of the episodic image candidates 21A-21H based on those the relevant factors. The scaling weights or values for the factors can amount to any combination of increases (e.g., 2 times, 3 times, etc.), decreases (e.g., 0.9 times, 0.8 times, etc.), or unit (e.g., 1 times) changes to the original scores of the episodic image candidates 21A-21H. In one example case, the scaling weights for each of the factors result in either a unit multiplier (i.e., no change) to the original scores or a reduction (e.g., 0.9 times, 0.8 times, etc.) in the original scores for all factors.

After the image processor 132 scales the scores of the episodic image candidates 21A-21H based on the relevant factors, the image discriminator 133 can identify a subset of the episodic image candidates 21A-21H as episodic images using the rule or rules 410. As shown in FIG. 4, the episodic images 22A-22C are selected from among the episodic image candidates 21A-21H by the image processor 132 through the application of the rule or rules 410 to the scaled scores (and/or associated factors) of the episodic image candidates 21A-21H. The rule or rules 410 can be similar to the image quality threshold 202 described above with reference to FIG. 3 but applied to the scaled scores (rather than the original scores) of the episodic image candidates 21A-21H. In other cases, the rule or rules 410 can define that the episodic image candidates 21A-21H must be associated with certain factors, such as having one or more faces, text, or other features in them, regardless of (or in combination with) the scaled scores to be identified as episodic images. The rules 410 can be defined in the factors and rules 125 and, in some cases, be particularly-defined for the video content 200.

Figure 5A:
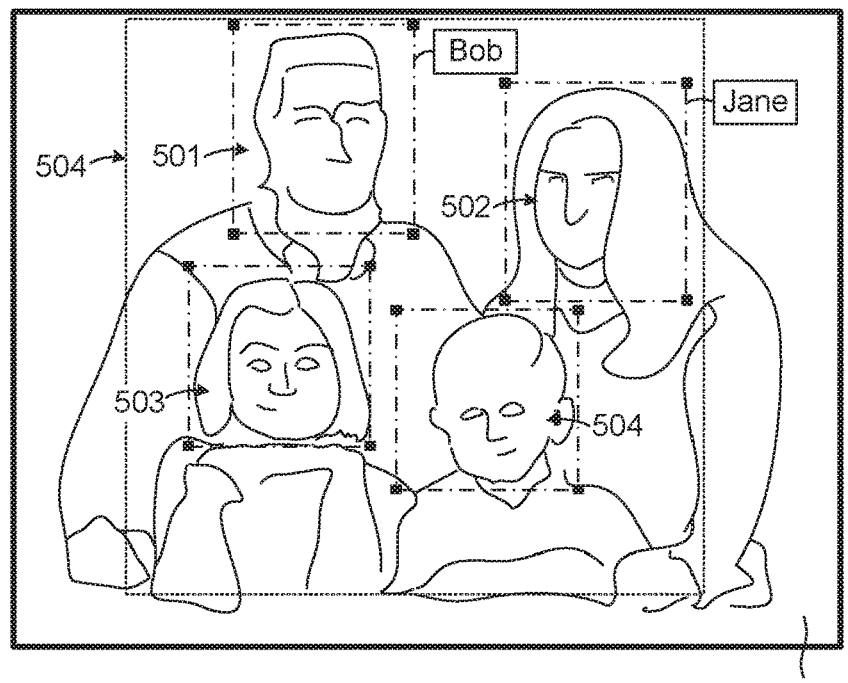
FIG. 5A illustrates the evaluation of image selection factors and rules according to example embodiments described herein.

FIG. 5A illustrates the evaluation of certain image selection factors and rules according to example embodiments described herein. FIG. 5A illustrates examples of faces 501-504 which have been identified by the image processor 132 in the image 21C using facial recognition techniques. More particularly, the image processor 132 has specifically identified the face 501 of the known actor "Bob" and the face 502 of the known actress "Jane" based on facial recognition techniques with reference to photographs of known actors and actresses stored in the reference database 126. The identification of the faces 501-504 in the image 21C can lead to a higher or lower score for the image 21C, possibly leading to the selection of the image 21C as an episodic image by the image discriminator 133. Alternatively, based on the application of a different rule, the image discriminator 133 can identify or select the image 21C as an episodic image because it includes "Bob," "Jane," or the combination of both "Bob" and "Jane," regardless of any original or scaled score for the image 21C. In the application of still different rules, the image discriminator 133 can discard the image 21C as an episodic image because it includes "Bob," "Jane," or the combination of both "Bob" and "Jane."

As also shown in FIG. 5A, the image processor 132 has identified that all the faces 501-504 are within the region 504 of the image 21C. Because episodic images may be scaled in size in some cases, one factor for the selection of episodic images is to determine whether certain features in the image 21C can fit within a predetermined-sized, cropped region of the image 21C. The can be useful, for example, if the image 21C needs to be scaled from a 16:9 aspect ratio to a 4:3 ratio if it is selected as an episodic image.

Figure 5B:
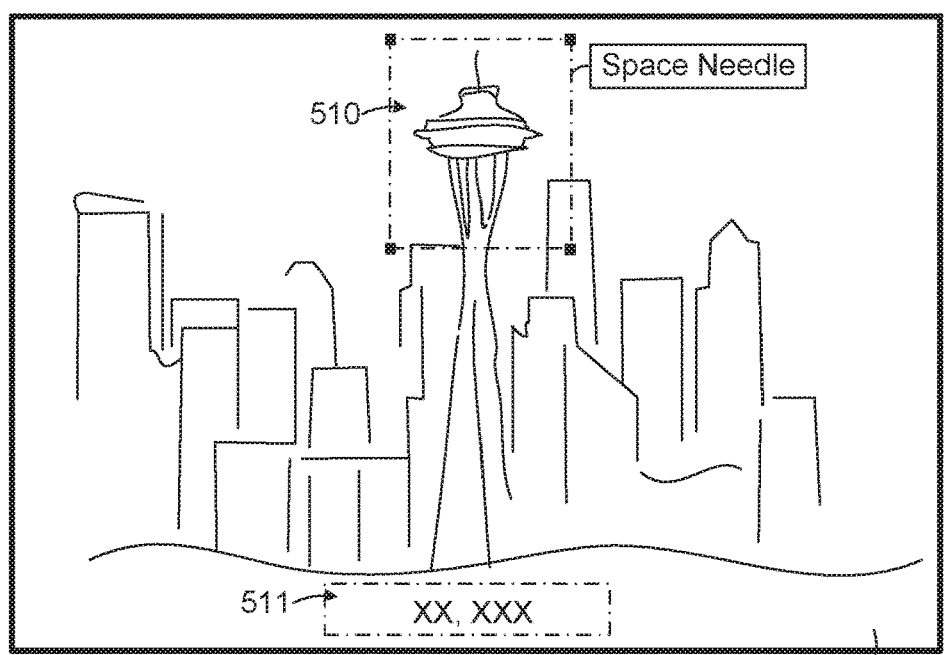
FIG. 5B illustrates the evaluation of other image selection factors and rules according to example embodiments described herein.

FIG. 5B illustrates the evaluation of other image selection factors and rules according to example embodiments described herein. FIG. 5B illustrates an example of a landmark 510 which has been identified by the image processor 132. More particularly, the image processor 132 has specifically identified the landmark 510 as the "Space Needle" with reference to images of known landmarks in the reference database 126. The identification of the landmark 510 in the image 21E can lead to a higher or lower score for the image 21E, possibly leading to the selection of the image 21E as an episodic image by the image discriminator 133. Alternatively, based on the application of a different rule, the image discriminator 133 can identify or select the image 21E as an episodic image because it includes the "Space Needle" landmark regardless of any original or scaled score for the image 21C. As also shown in FIG. 5B, the image processor 132 has identified that the image 21E includes text 511. The identification of the text 511 can lead to a higher or lower scaled score for the image 21E.

Figure 6:
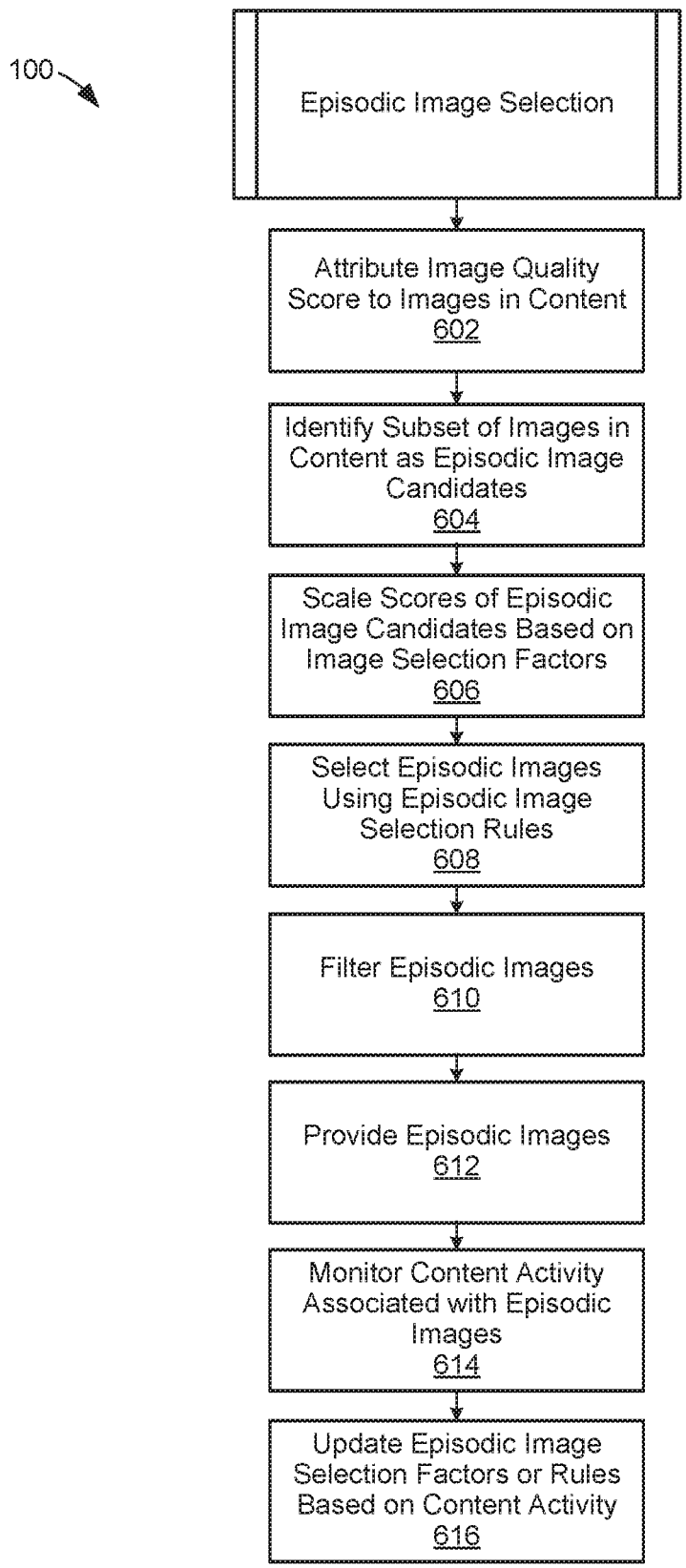
FIG. 6 illustrates a process of episodic image selection performed by the computing environment shown in FIG. 2 according to various example embodiments described herein.

Building on the description above, FIG. 6 illustrates a process of episodic image selection performed by the computing environment 110 shown in FIG. 2 according to various example embodiments described herein. In certain aspects, the process flowchart in FIG. 6 can be viewed as depicting an example set of steps performed by the computing environment 110. The flowchart in FIG. 6 provides merely one example of a functional sequence or arrangement of steps that can be employed to implement the aspects of episodic image selection described herein. Although the process is described in connection with the computing environment 110, other computing environments, systems, and/or devices can perform the process. Additionally, although not explicitly stated below, among each of the process steps described, any number of intermediate data accessing, storing, and logging steps can be performed among the episodic image engine 130, the data store 120, and other components in the computing environment 110.

At reference numeral 602, the process includes the image processor 132 attributing an image score to one or more images in an item of video content. To attribute an image score to images in the video content, the image processor 132 can determine or calculate the contrast, brightness, sharpness, distortion, noise, dynamic range, color accuracy, exposure, or other image quality factor (or combination of factors) of individual images, for example, as described above with reference to FIG. 3. At reference numeral 602, the image processor 132 can process any number of individual images (up to and including all images) in a given item of video content. It is not necessary in every case, however, that a large number (or all) images of the item of video content are processed at reference numeral 602. In some cases, images from one or more defined periods of time (e.g., 1:30-2:45 and 10:23-11:34 minutes, etc.), ranges (e.g., first quartile, last quartile, 15%-20% and 90-100%, etc.), or other portions of the video content can be processed to attribute each one of them a respective image quality score.

The number and type of the image quality factors calculated by the image processor 132 at reference numeral 602 can vary from image to image in an item of video content. The number and type of the image quality factors can be based on the genre of the video content, the length of the video content, the source of the video content, or other relevant factors described herein. Further, if the image processor 132 calculates multiple image quality factors for a single image at reference numeral 602, the image processor 132 can also calculate a weighted average of the quality factors to arrive at a base score for the image as described above.

At reference numeral 604, the process includes the image discriminator 133 identifying a subset of the images in the video content processed at reference numeral 602 as episodic image candidates. The image discriminator 133 can identify the subset of the images as episodic image candidates using a threshold such as the image quality threshold 202 described above with reference to FIG. 3. The image quality threshold can be defined in the factors and rules 125 and, in some cases, be particularly-defined for the video content processed at reference numeral 602. The image discriminator 133 can compare each of the base scores of the images against the image quality threshold to cull out ones that fail to meet the threshold, arriving at a reduced set of episodic image candidates. In FIG. 3, for example, the score $A_C$ of the image 20C is presented as an example of one score that did not meet the image quality threshold 202. Through the application of the image quality threshold 202 in FIG. 3 as one example, the image discriminator 133 identifies the subset of images 21A-21H as episodic image candidates among the images 20A-20N. In practice, any suitable number of episodic image candidates can be identified by the image discriminator 133 at reference numeral 604 by adjusting the image quality threshold (or other metric) used. In that context, the image quality threshold can be selected to arrive at a certain percentage or a certain number of the total number of images processed at reference numeral 602 as being identified as episodic image candidates at reference numeral 604.

At reference numeral 606, the process includes the image processor 132 scaling the base scores of the episodic image candidates determined at reference numeral 604 based on whether or not one or more episodic selection factors apply to the episodic image candidates. The image processor 132 first examines the episodic image candidates determined at reference numeral 604 to determine whether or not additional factors apply to (or are found in) them, respectively. The additional factors can include whether or not there is text in an image; whether or not there is a face (or certain number of faces) in an image; whether or not an image is associated with a timecode or time range; whether or not a specific actor, actress, or other character is present in an image; whether or not there is a logo, trademark, or tradename in an image; or any of the other factors described herein (e.g., with reference to FIG. 4, 5A, or 5B).

The image processor 132 then scales the scores of the episodic image candidates determined at reference numeral 604 based on the factors found to be applicable to them. The scaling weights or values for the any applicable factors can amount to any combination of increases (e.g., 2 times, 3 times, etc.), decreases (e.g., 0.9 times, 0.8 times, etc.), or unit (e.g., 1 times) changes to the original scores of the episodic image candidates identified at reference numeral 604. In one case, the scaling weights for the factors result in either a unit multiplier (e.g., 1 times) or no change to the original scores or reduction (e.g., 0.9 times, 0.8 times, etc.) in the original scores for all factors.

At reference numeral 608, the process includes the image discriminator 133 identifying a subset of the episodic image candidates identified at reference numeral 604 as episodic images through the application of certain rules to the scaled scores (and/or associated factors) of the episodic image candidates determined at reference numeral 606. As shown in FIG. 4, for example, the episodic images 22A-22C are selected from the episodic image candidates 21A-21H by the image processor 132 by the application of the rule or rules 410 to the scaled scores of the episodic image candidates 21A-21H. The rule or rules 410 can be similar to the image quality threshold 202 described above with reference to FIG. 3 but applied to the scaled scores (rather than the original scores) of the episodic image candidates 21A-21H. In other cases, the rule or rules 410 can define that the episodic image candidates 21A-21H must be associated with certain factors, such as including one or more faces, text, or other features, regardless of (or in combination with) the scaled scores to be identified as episodic images. Thus, at reference numeral 608, a number of episodic images are selected for an item of video content.

At reference numeral 610, the process includes the episodic image filter 134 filtering and storing a number of the episodic images selected at reference numeral 608. More particularly, the episodic image filter 134 evaluates the episodic images selected at reference numeral 608 and filters out a number of them based on certain factors or rules at reference numeral 610. Generally, the factors or rules considered by the episodic image filter 134 seek to arrive at a set of episodic images that are visually distinguished (or distinguishable) from each other and also visually distinguished from similar content, such as different episodes of the same sitcom or game show, for example.

In that context, the episodic image filter 134 can compare an episodic image determined at reference numeral 608, which was selected for one item of video content, to an episodic image for another item of video content determined and stored previously. The episodic image filter 134 can then determine a level or metric of distinguishability between them using image processing techniques. In that way, the episodic image filter 134 can determine whether the episodic image selected for one item of video content is sufficiently different from that selected for other items of video content. If not, the episodic image filter 134 can discard that episodic image as being too similar to others for related content. As another example, the episodic image filter 134 can identify a number of the episodic images that are relatively close in time chronologically (i.e., are not disparate enough in video content time). In that case, the episodic image filter 134 can select the first one and discard the others, select the one with the highest scaled score, merge the images together, or select one of them according to another suitable basis.

At reference numeral 612, the process includes the content distribution service 140 providing one or more of the episodic images determined at reference numerals 608 or 610 for use in one or more user interfaces such as the example user interface 10 shown in FIG. 1. In some cases, the content distribution service 140 can provide different episodic images in different user interfaces at different client devices.

At reference numeral 614, the process includes the feedback module 142 monitoring for different levels of content selection or viewing activity with reference to the display of different episodic images in user interfaces. As noted above, the feedback module 142 is configured to track statistics or other use-related data associated with different episodic images displayed in different user interfaces. As one example, after a set of episodic images are selected for an item of video content, the content distribution service 140 can provide or serve up different ones of those episodic images in different user interfaces presented on different client devices 160. Based on any difference in the selection (or rate of selection) of the same item of video content by users at the different client devices 160, the feedback module 142 can determine that certain episodic images appear to lead to a higher rate of viewing the underlying content.

At reference numeral 616, the process includes the feedback module 142 updating the episodic image selection factors or rules based on the content selection or viewing activity monitored for at reference numeral 614. For example, for an episodic image associated with a greater likelihood of the selection of the underlying, associated content, the feedback module 142 can identify the factors which lead to the selection of that episodic image with reference to the images log 124. The feedback module 142 can then apply similar factors in the future for the selection of new episodic images for similar content in an effort to improve the selection of episodic images.

Figure 7:
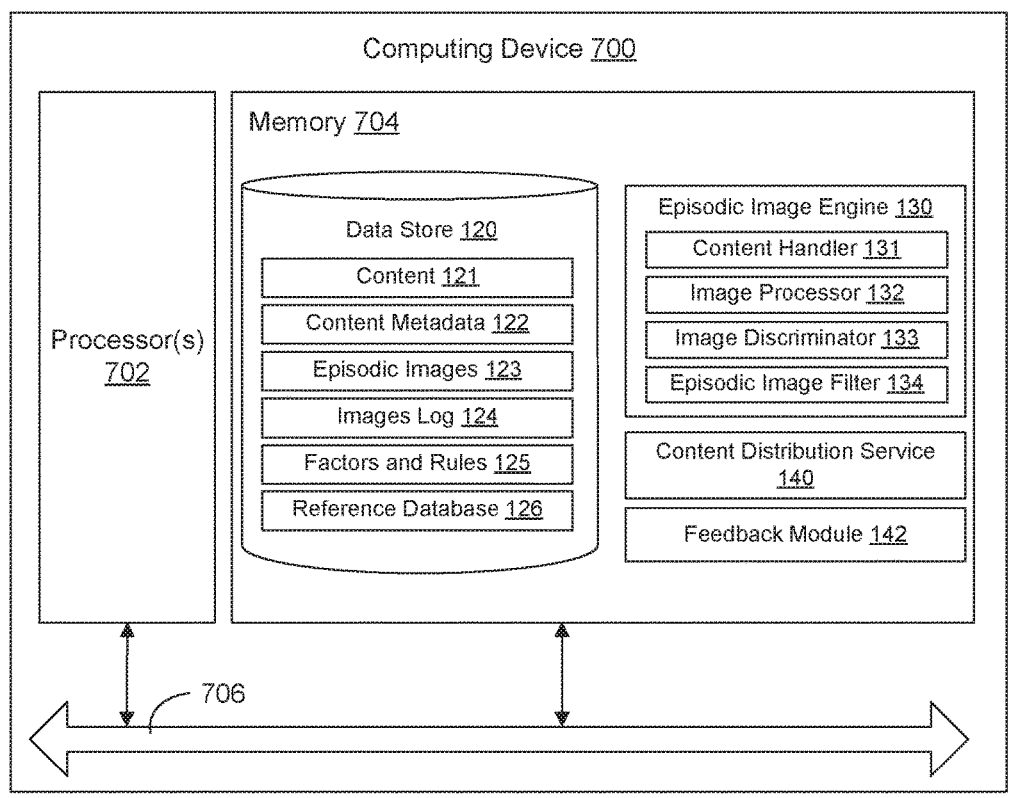
FIG. 7 illustrates an example schematic block diagram of a computing device for the computing environment shown in FIG. 2 according to various embodiments described herein.

FIG. 7 illustrates an example schematic block diagram of a computing device 700 embodiment example of the computing environment 110 shown FIG. 2 according to various embodiments described herein. The computing device 700 includes at least one processing system, for example, having a processor 702 and a memory 704, both of which are electrically and communicatively coupled to a local interface 706. The local interface 706 can be embodied as a data bus with an accompanying address/control bus or other addressing, control, and/or command lines.

In various embodiments, the memory 704 stores data and software or executable-code components executable by the processor 702. For example, the memory 704 can store executable-code components associated with the episodic image engine 130, content distribution service 140, and feedback module 142 for execution by the processor 702. The memory 704 can also store data such as that stored in the data store 120, among other data.

It is noted that the memory 704 can store other executable-code components for execution by the processor 702. For example, an operating system can be stored in the memory 704 for execution by the processor 702. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 704 stores software for execution by the processor 702. In this respect, the terms "executable" or "for execution" refer to software forms that can ultimately be run or executed by the processor 702, whether in source, object, machine, or other form. Examples of executable programs include, for example, a compiled program that can be translated into a machine code format and loaded into a random access portion of the memory 704 and executed by the processor 702, source code that can be expressed in an object code format and loaded into a random access portion of the memory 704 and executed by the processor 702, or source code that can be interpreted by another executable program to generate instructions in a random access portion of the memory 704 and executed by the processor 702, etc.

An executable program can be stored in any portion or component of the memory 704 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 704 can include both volatile and nonvolatile memory and data storage components. Volatile components are those that do not retain data values upon loss of power. Nonvolatile components are those that retain data upon a loss of power. Thus, the memory 704 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 702 can be embodied as one or more processors 702 and the memory 704 can be embodied as one or more memories 704 that operate in parallel, respectively, or in combination. Thus, the local interface 706 facilitates communication between any two of the multiple processors 702, between any processor 702 and any of the memories 704, or between any two of the memories 704, etc. The local interface 706 can include additional systems designed to coordinate this communication, including, for example, a load balancer that performs load balancing.

As discussed above, the episodic image engine 130, content distribution service 140, and feedback module 142 can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIG. 6 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 702. The machine code can be converted from the source code, etc. Further, each block can represent, or be connected with, a circuit or a number of interconnected circuits to implement a certain logical function or process step.

Although the flowchart or process diagram in FIG. 6 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including the episodic image engine 130, content distribution service 140, and feedback module 142 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIG. 6. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying at least one program that, when executed by at least one computing device, directs the at least one computing device to perform a method comprising:
    attributing a quality score to individual ones of a plurality of images in video content based on an image quality factor;
    identifying a subset of the plurality of images as a plurality of episodic image candidates using an image quality threshold;
    scaling an image score of individual ones of the plurality of episodic image candidates based on a first episodic image selection factor associated with a segment time-code and a second episodic image selection factor associated with content of the individual ones of the plurality of episodic image candidates;

selecting at least one episodic image for the video content from among the plurality of episodic image candidates using an episodic image selection rule;

comparing the at least one episodic image for the video content to at least one other episodic image in other video content to determine a distinguishability metric between the at least one episodic image and the at least one other episodic image; and in response to the distinguishability metric meeting a predefined criteria, providing the at least one episodic image as a representative image for the video content for display in a user interface of a content distribution service.

2. The non-transitory computer-readable medium according to claim 1, wherein attributing the quality score to the individual ones of a plurality of images in video content comprises:

determining a first quality score of the individual ones of the plurality of images in the video content based on a brightness and a contrast of the individual ones of the plurality of images; and determining a second quality score of the individual ones of a plurality of images in the video content based on a whether there is a face in the individual ones of the plurality of images.

3. The non-transitory computer-readable medium according to claim 1, wherein:

scaling the image score of the individual ones of the plurality of episodic image candidates comprises multiplying the image score of the individual ones of the plurality of episodic image candidates based on a first weight associated with the first episodic image selection factor and a second weight associated with the second episodic image selection factor.

4. A method, comprising:

attributing, by at least one computing device, a quality score to an image in video content based on an image quality factor of the image;

scaling, by the at least one computing device, the quality score of the image based on a first episodic image selection factor associated with a segment timecode for the image and a second episodic image selection factor associated with content of the image; and selecting, by the at least one computing device, the image from among a plurality of images in the video content as an episodic image for the video content based on the quality score of the image and an episodic image selection rule.

5. The method according to claim 4, wherein:

attributing the quality score to the image in the video content comprises:

attributing, by the at least one computing device, a first quality score to individual ones of a plurality of images in the video content based on a brightness and a contrast of the individual ones of the plurality of images; and attributing, by the at least one computing device, a second quality score to the individual ones of a plurality of images in the video content based on a whether there is a face in the individual ones of the plurality of images; and the method further comprises identifying, by the at least one computing device, a subset of the plurality of images as a plurality of episodic image candidates through a comparison between an image quality threshold and a combination of the first quality score and the second quality score of the individual ones of the plurality of images.

6. The method according to claim 5, wherein scaling the quality score of the image comprises scaling, by the at least one computing device, the quality score of the individual ones of the plurality of episodic image candidates based on the first episodic image selection factor and the second episodic image selection factor.

7. The method according to claim 6, wherein selecting the image as the episodic image for the video content comprises selecting, by the at least one computing device, a plurality of episodic images for the video content from among the plurality of episodic image candidates based on an episodic image selection rule.

8. The method according to claim 7, further comprising:

filtering, by the at least one computing device, the plurality of episodic images; and providing, by the at least one computing device, a number of the plurality of episodic images as representative images for the video content for display in different user interfaces of a content distribution service at a plurality of different client devices.

9. The method according to claim 8, further comprising:

monitoring, by the at least one computing device, for a selection of the video content in association with individual ones of the representative images for the video content; and updating, by the at least one computing device, at least one of the first episodic image selection factor, the second episodic image selection factor, or the episodic image selection rule based on the monitoring.

10. The method according to claim 8, wherein the filtering comprises reducing a number of the plurality of episodic images based on a distribution in time of the plurality of episodic images in the video content.

11. The method according to claim 8, wherein the filtering comprises reducing a number of the plurality of episodic images according to a timecode correlation of the plurality of episodic images as compared to a plurality of other episodic images in other video content.

12. The method according to claim 8, wherein:

the filtering comprises comparing, by the at least one computing device, at least one of the plurality of episodic images for the video content to at least one other episodic image in other video content to determine a distinguishability metric between the at least one of the plurality of episodic images and the at least one other episodic image; and the method further comprises eliminating the at least one of the plurality of episodic images in response to the distinguishability metric failing to meet a predefined criteria.

13. The method according to claim 4, wherein the second episodic image selection factor comprises at least one among the following factors: whether there is text in an image and whether there is a face in an image.

14. The method according to claim 4, wherein:

the second episodic image selection factor is associated with a genre of the video content; and the episodic image selection rule requires that a face of a predetermined actor be within the image.

15. The method according to claim 4, wherein the episodic image selection rule requires that at least two faces of predetermined actors be within a region of the image.

16. A system, comprising:

a memory device to store computer-readable instructions thereon; and at least one computing device configured through execution of the computer-readable instructions to:

determine an image score of an image in content based on at least one of an image quality factor or an image selection factor;

scale the image score of the image based on a first episodic image selection factor associated with a segment timecode for the image and a second episodic image selection factor associated with content of the image;

select the image from among a plurality of images in the content as an episodic image for the content based on the image score and an episodic image selection rule; and provide the episodic image as a representative image for the content for display in a user interface.

17. The system of claim 16, wherein the at least one computing device is further configured to:

attribute an image score to individual ones of a plurality of images in the content based on a brightness and a contrast of the individual ones of the plurality of images; and identify a subset of the plurality of images as a plurality of episodic image candidates using an image quality threshold.

18. The system of claim 17, wherein the at least one computing device is further configured to scale the image score of the individual ones of the plurality of episodic image candidates based on the image selection factor.

19. The system of claim 18, wherein the at least one computing device is further configured to select a plurality of episodic images for the content from among the plurality of episodic image candidates based on an image selection rule.

20. The system of claim 19, wherein the at least one computing device is further configured to:

provide a number of the plurality of episodic images as representative images for video content for display in different user interfaces of a content distribution service at a plurality of different client devices; and monitor for a selection of the video content in association with individual ones of the representative images for the video content.

* * * * *